April 18, 1939.  C. F. BYLAND  2,155,052
MEANS FOR DESTROYING THE ENERGY OF MASS OSCILLATIONS OF SOLID BODIES
Filed April 12, 1937  2 Sheets-Sheet 1
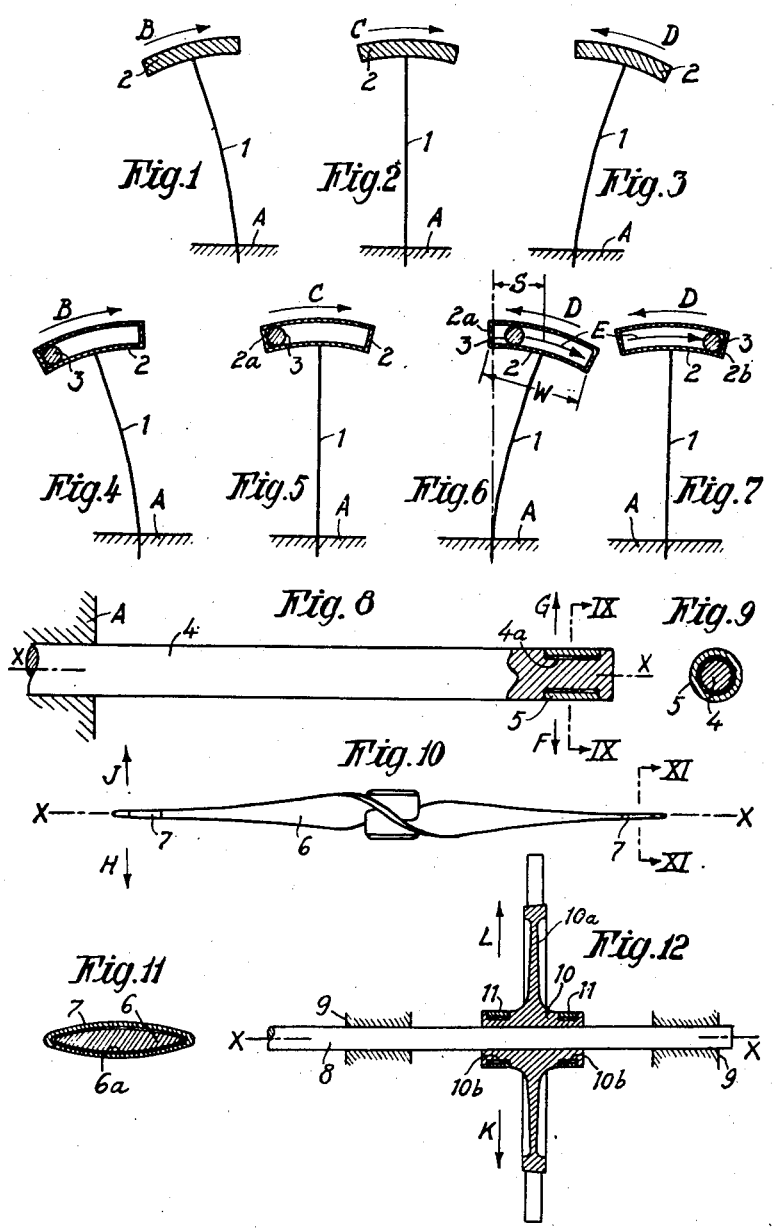
INVENTOR:
CONRAD FRIEDRICH BYLAND
PER: *J. Gevers*
Attorney

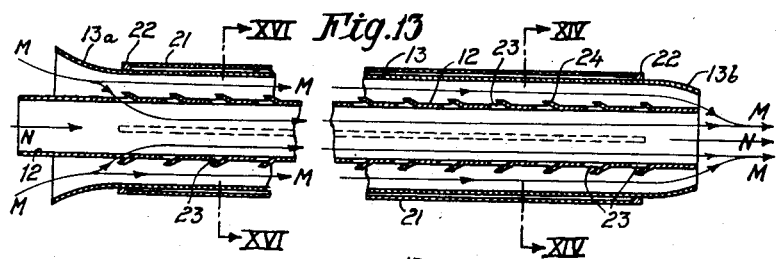
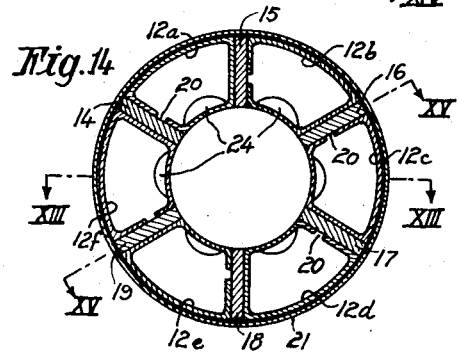
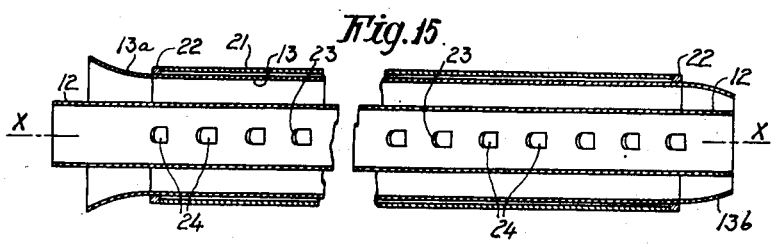
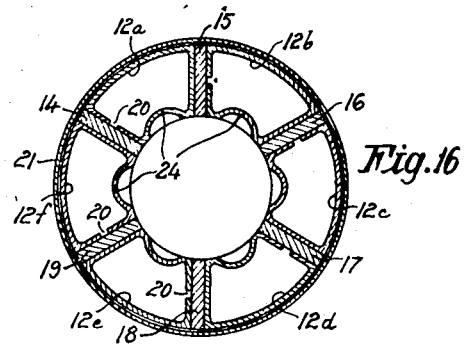

Patented Apr. 18, 1939

2,155,052

UNITED STATES PATENT OFFICE 2,155,052

MEANS FOR DESTROYING THE ENERGY OF MASS OSCILLATIONS OF SOLID BODIES

Conrad Friedrich Byland, Zurich, Switzerland, assignor to Dresag A. G., Zurich, Switzerland Application April 12, 1937, Serial No. 136,508
In Austria April 27, 1936

4 Claims. (Cl. 188—1)

This invention relates to means for destroying the energy of mass oscillations of bodies of solid material by the use of dampening masses applied to the body at least approximately at a place where the amplitude of the oscillations is greatest.

It has already been proposed to apply friction members to the body to be dampened. These added members which hold by means of sliding friction on to the body to be dampened, due to the material inertia of their masses, cannot follow the relatively quick oscillations of the body to be dampened and therefore destroy oscillatory energy by friction at the places where they slide. It is obvious that these members can be utilised without great difficulties on large bodies for dampening oscillations, but it does not appear possible to use them for example also for propellers and similar rotary bodies having an external formation which does not permit of substantial constructional changes. This circumstance alone limits the use of such members to a very narrow field of application.

Furthermore devices for dampening oscillations are known in which arms provided with weights are mounted on the rotary body to be dampened. When the said body rotates, the arms and weights rotate with it, but with a certain displacement of phase, whereby the oscillations of the weighted arms operate contrariwise to the oscillations of the said body and thereby partly balance the last named oscillations. There is however the disadvantage that the said arms must possess length in order to be at all effective, and consequently they project considerably from the said body and alter the exterior form thereof, with the result that these devices cannot be employed in those cases where the exterior form of the said body must not suffer any change. Furthermore the choice and determination of the oscillation frequency of the arms and weights required to produce the necessary phase displacement are exceptionally difficult.

It has also been proposed, for example in propellers, for the purpose of dampening the oscillations of flexure of the blades, to make the blade tips hollow and fill them with a liquid dampening mass in such a way that when the blade oscillates, the liquid dampening means is forced to oscillate with it and thereby destroy the oscillations of the blades. This arrangement is capable of exercising a certain extent of dampening effect on the oscillations of flexure of the blades when the propeller is not rotating, but is completely ineffective when the propeller is in rotation, because the dampening liquid is then subjected to effect of centrifugal force and driven thereby into the extremities of the blade tips and cannot move to any material extent in a direction perpendicular to the propeller axis.

Vibration dampeners for rotary shafts and the like are also known wherein, torques set up by eccentrically mounted movable weights subjected to centrifugal action act in contra-direction to the oscillations of the shaft or the like caused by irregularities in the driving torque. Dampeners of this kind are however only suitable for dampening torsional oscillations, and not also for bending or transverse oscillations, and furthermore are effective only for rotating bodies.

The object of my invention is to provide a device for destroying the energy of mass oscillations of solid bodies which completely obviates all the disadvantages of hitherto known arrangements.

According to the invention this object is attained by so arranging the dampening mass on the body that the said mass allows itself to be displaced a small distance relative to the body in the direction of the oscillations of the body, the whole being so arranged that the dampening mass is caused to oscillate with the body but the said mass changes its direction of oscillation only after the body has again swung against it in such a manner that the body and dampening mass impinge against each other at every change in the direction of oscillation and suffer loss of oscillatory energy by each collision which thereby occurs.

In the drawings, some examples explain the invention and possible forms of embodiment have been illustrated.

Fig. 1 is a diagrammatic illustration of a swing body of known construction fixed to a spring.

Fig. 2 illustrates the same swing body in another position.

Fig. 3 illustrates the swing body of Figs. 1 and 2 in a third position.

Fig. 4 illustrates a swing body similar to that of Figs. 1 to 3 but modified in accordance with the invention and in a first position.

Fig. 5 shows the swing body of Fig. 4 in a second position.

Fig. 6 illustrates the swing body of Fig. 4 in a third position.

Fig. 7 is a fourth position of the swing body illustrated in Fig. 4.

Fig. 8 is a metal rod provided with the means according to the invention and clamped at one end.

Fig. 9 is a section on line IX—IX of Fig. 8.

Fig. 10 shows a propeller provided with the means in accordance with the invention.

Fig. 11 is a section on line XI—XI of Fig. 10.

Fig. 12 is a diagrammatic illustration of a steam turbine shaft equipped with a device in accordance with the invention.

Fig. 13 illustrates an exhaust silencer for combustion engines equipped in accordance with the invention and in section on line XIII—XIII of Fig. 14.

Fig. 14 is a section on line XIV—XIV of Fig. 13.

Fig. 15 is a section on line XV—XV of Fig. 14.

Fig. 16 is a further section on line XVI—XVI of Fig. 13.

In the drawings Figures 1 to 3 show diagrammatically, for the purpose of explaining what happens to a swing body not provided with means according to the invention or any other means for dampening its vibrations, a swing body 2 which vibrates on a spring blade 1 rigidly clamped at A. Assuming the swing body 2 is set in vibration by pushing it from a position of rest agreeing with the position shown in Figure 2 into the position shown in Figure 1, and then suddenly releasing it, the blade spring 1 will produce a force upon the body 2 corresponding to the blade resistance and the flexion of the blade, said force causing the body to swing in the direction of the arrow B shown in Fig. 1 after it has been released. In Fig. 2, the spring 1 and the swing body 2 are in their normal position; the spring 1 is here released. During the stroke from the position illustrated in Fig. 1 to that of Fig. 2, the spring body, however, has received a determined kinetic energy which causes the swing body 2 to oscillate over in the direction of the arrow C beyond the released position of Fig. 2, and so long until the spring 1 now resisting the movement in the direction of arrow C will have absorbed the kinetic energy of the spring body 2 during this stroke. When this is the case, the swing body comes again at rest. The spring and the swing body thus take the position shown in Fig. 3. Now, in this position, the spring 1, again under tension, acts upon the swing body 2, so that the latter performs another oscillation in the direction of the arrow D, shown in Fig. 3, so that it swings again beyond the normal position of Fig. 2, for the purpose of swinging again after the position illustrated in Fig. 1 has been reached. This to and fro swinging would be continued infinitely when no inner frictions of the blade spring or outer resistances of air would absorb the energy of the swing body so that the latter finally comes at rest. However, these resistances are proportionally small with respect to the energy of the moving swing body, so that the latter will always perform a considerable number of oscillations before it comes at rest. The duration of a separate oscillation is now a longer or a shorter one, according to the dimension of the spring and the size of the swing body. When for instance the swing body produces more than sixteen oscillations in a second, these oscillations are not only perceptible as vibrations, respectively as swinging movements for the eye, however also the human ear will observe them by resonance.

Figures 4 to 7 illustrate diagrammatically the principle underlying the invention. In these figures there is shown a hollow swing body 2 which vibrates on a blade spring 1 rigidly clamped at A and which is to be damped. The swing body 2 of these figures is shown as containing inside it a loose ball 3 constituting the dampening mass. Assuming the hollow body 2 is set in vibration by pushing it from the position shown in Figure 5 into the position shown in Figure 4 and then suddenly releasing it, the hollow body 2 will oscillate under the action of the spring 1 in the direction of the arrow B illustrated in Fig. 4, with a constantly increasing speed. In the position of Fig. 5, the speed of the swing body 2 and also of the ball 3 has reached a common maximum. The spring 1 is completely released in this position. The kinetic power collected by the swing body 2 during the stroke from the position of Fig. 4 to that of Fig. 5, however, secures that the swing body 2 oscillates beyond the normal position of Fig. 5 in the direction of the arrow C. During the stroke from the position of Fig. 5 to that of Fig. 6, the energy of the swing body 2 is progressively transmitted again to the spring 1, which has for result that the movement of the swing body 2 becomes progressively slower, until it comes finally at complete rest, in the position of Fig. 6. However, the ball 3 moves forward in the direction of the arrow E, illustrated in Fig. 6, with its maximum speed, which it has already reached in the position of Fig. 5. This has for result that the ball 3, at the moment when the swinging elements reach the position illustrated in Fig. 5, is removed from the bottom 2a of the swing body, so as to move over a determined distance towards the middle of the swing body, to the position shown in Fig. 6. The swing body, which has now come at rest in the position of Fig. 6, now swings back under the effort of the spring, in the direction of the arrow D, whereas, however, the body 3 moves further on in the direction of the arrow E. In the position illustrated in Fig. 7, the backward movement of the swing body in the direction of the arrow D has reached its highest speed.

Assuming that this speed is $v_1=2$ m/sec. and that the weight of the swing body is $G_1=9.81$ kg., the kinetic energy of the swing body in the position illustrated in Fig. 5 is then, when $g=9.81=$ the earth acceleration, approximately as follows:

$$L_1 = \frac{G_1 \cdot v_1^2}{g \cdot 2}$$

$$L_1 = \frac{9.81 \cdot 4}{9.81 \cdot 2} = 2 \text{ m kg.}$$

The speed $v_2$ of the ball 3 being at the moment of impact against the bottom 2b of the swing body (Fig. 7) also 2 m/sec. and the weight $G_2$ of the ball being also 9.81 kg., the kinetic energy of the ball, at the moment of impact, will then also be approximately:

$$L_2 = \frac{G_2 \cdot v_2^2}{g \cdot 2}$$

$$L_2 = \frac{9.81 \cdot 4}{9.81 \cdot 2} = 2 \text{ m kg.}$$

In the position illustrated in Fig. 7, the ball 3 abuts against the bottom 2b of the oppositely swinging body 2. Thereby is produced a loss of energy, as well in the ball as in the swing body 2. This loss of energy then represents for the example proposed:

$$A = \frac{G_1 \cdot G_2}{G_1 + G_2} \cdot \frac{(v_1+v_2)^2}{2 \cdot g} \cdot (1-k^2)$$

Herein is again designated:
$G_1 = 9.81$, the weight of the swing body in kg.,
$G_2 = 9.81$, the weight of the ball in kg.,
$v_1 = 2$, the speed of the swing body in m/sec.
$v_2 = 2$, the speed of the ball at impact in m/sec.
$g = 9.81$, the earth acceleration in m/sec.$^2$,
$k = 0$, the so-called impact number which, assuming that the ball is formed of a practically completely unelastic material (for instance lead) may be brought to nihil.

Thus the complete loss of energy produced by the mutual impact of the swing body and the ball represents:

$$A = \frac{9.81 \cdot 9.81}{19.62} \cdot \frac{16}{2 \cdot 9.81} \cdot 1 = 4 \text{ m kg.}$$

The total loss of energy thus represents in the foregoing example of calculation 4 m kg. As the kinetic energy of the swing body and the ball is also about 4 m. kg., the position shown in Fig. 7 gives the result that, on the mutual impact, the total movement energy of the swing body and the ball is cancelled, so that, as the spring in this position is also released, the swing body and the ball remain completely at rest.

The movement of the swing body 2 in this example (Figs. 4 to 7) has thus been stopped after ¾th of an oscillation. The free space in the swing body 2, respectively the distance W (Fig. 6), and the distance over which the ball 3 can be shifted over the swing body, oppositely to the direction of the swinging amplitude, corresponds in the example illustrated in Figs. 4 to 7 to about twice the amplitude value S of oscillation.

In the example of embodiment according to Figs. 8 and 9, 4 designates a metal rod fixedly clamped at A. At its free end, the rod 4 has a portion of reduced diameter 4a, in which is arranged a hollow cylindrical damping mass 5, in such a manner that it can be somewhat shifted with respect to the rod in the swinging direction indicated by the arrows F, G.

When now a blow is given upon the rod in a direction transverse to the axis X—X thereof, the rod starts flexion oscillations which reach their greatest amplitude at the rod end provided with the mass 5. During the reciprocating swinging of the rod end, the damping mass 5 is also thrown in opposite directions. As between the mass 5 and the rod is provided a small air space, which makes possible the shifting of the mass 5, the change of direction in swinging of the damping mass 5 will always be produced somewhat later than the change of direction in the oscillations of the rod, i. e. the damping mass 5 only impacts on the rod when the latter oscillates again in the opposite direction to that of the damping mass, so that, at each impact, part of the oscillation energy of the rod is cancelled until the latter comes completely at rest.

The proportions will be here in principle those given namely for the examples of Figs. 4 to 7, with that difference that the oscillation frequency in the rod illustrated in Figs. 8 and 9 is of uneven value with relation to that in the swinging system as illustrated in Figs. 4 to 7. The embodiment and the selection of dimension of the swing body 4 illustrated in Figs. 8 and 9 are corespondingly also much shorter than the swinging amplitude as in the example according to Figs. 4 to 7. Accordingly, the stroke for the relative movement of the damping mass must obviously be shorter. As practical experiments have shown, very good results are obtained for the silencing of swinging bodies within the range of audibility, when the intermediate space between the damping mass and the body to be silenced is dimensioned in accordance with the permissible deviation in accordance with what is called in technics a "loose seating".

Whereas by a "rigid seating" (pressed seating) of the damping mass upon the body to be silenced will also with a relatively considerable mass only be capable of producing a very small lowering of the oscillation frequency, the method of fixation in a loose manner and according to the invention produces, even with very small damping masses, an immediate and complete destroying of oscillations. So, for instance, this object is already reached with a damping mass which is only approximately 2 to 5% of the mass of the body to be silenced. In accordance with the law of impact, it will be advantageous to use for the damping mass, as much as possible, a non-elastic material, such as lead or a composition of lead. Furthermore, the deadening effect may be considerably enhanced and the damping masses are mounted at the places of greatest swinging amplitude which may be observed empirically in swinging bodies of complicated structure. Thus, for instance, in a diapason the oscillations are instantaneously destroyed, when at least around one branch end is loosely wound a thin strip of lead.

In the example of Figs. 10 and 11, 6 designates a propeller. It has close to both ends of the blades, similar to the rod 4 of Figs. 8 and 9, a groove 6a, in which is loosely mounted a damping mass 7, which means that said mass is arranged to be movable in the direction of oscillations shown by the arrows H, J. During the swinging of the propeller blades, in a direction at right angles to the axis X—X, the damping masses 7 swing simultaneously, however, with a determined phase shifting with respect to the propeller blade mass, like this has been explained with reference to the examples of Figs. 8 and 9. The interference resulting from this phase shifting secures an immediate restriction of the oscillation energy of the propeller blade, so that the latter cannot constitute either a primary source of noise by own frequency or secondarily a resonator.

In the example according to Fig. 12, 8 designates diagrammatically a steam turbine shaft mounted in bearings 9, with a fly-wheel 10 arranged thereon. The hub of the fly-wheel has at both sides of the fly-wheel disc 10a, a portion of reduced diameter 10b, coaxial with the shaft 8 and in which is loosely arranged a damping mass in the shape of an annular body 11, which means that it is movable in the direction of oscillation according to the arrows K, L.

During occasional flexion oscillations of the shaft 8, which have their greatest amplitude in the middle between both bearings, the annular bodies 11 will also oscillate, however, like the damping masses described in the foregoing examples, with a determined delay with respect to the shaft and fly-wheel mass; in this way, the oscillations in the shaft will be silenced, respectively destroyed, at each consequential mutual impact of the oppositely swinging masses.

In Figs. 13 to 16 is provided an exhaust silencer for moving combustion engines, for motor-cars and aircraft and provided with a device in accordance with the invention. 12 designates (Figs. 13 and 15) an exhaust pipe communicating with the exhaust conductor of the motor and which is also provided with a relatively large jacket 13. This jacket 13 is widened at one end 13a, in the shape of a funnel, and at the other end, which is at a level with the exhaust pipe 12, it has a tuyere-shaped narrowing 13b. As well the pipe 12 as the jacket 13 are constituted by means of sector-shaped hollow elements 12a, 12b, 12c, 12d, 12e, 12f (Figs. 14 and 16), whereas between each pair of these hollow elements is arranged a noise absorbing material, such as asbestos, forming a separation wall 14, 15, 16, 17, 18 and 19, radially arranged and fixed along each of the adjacent also radially directed side walls of the sector-shaped hollow elements. As shown in Figs. 14 and 16, only one side wall of each sector constitutes a plain element, whereas the corresponding side wall leaves a joint 20 free. The jacket 13 is in turn loosely surrounded by a band 21, made of a material of low elasticity but considerable mass density, for instance a band made of a copper alloy or the like, whereas said band is assured against axial shifting by means of two rings 22, fixedly mounted upon the jacket 13 (Figs. 13 and 15).

The inner walls of the sectors 12a, 12b, 12c, 12d, 12e and 12f, forming the pipe 12, are each provided with a series of openings 23, which are each produced by stamping and bending outside the wall small lugs 24. These lugs 24 now are so arranged that they are directed with their outwardly bent edges towards the funnel-shaped enlargement 13a of the jacket 13.

Occasional flexion oscillations in the exhaust silencer illustrated in Figs. 13 to 16 are immediately destroyed by the damping band 21, which is loosely connected to the jacket 13 and in which are produced operations different in phase. The silencing effect is actually increased by the shown embodiment of the motor silencer, particularly by means of the intermediate noise absorbing separation walls.

The exhaust silencer described herebefore is advantageously mounted in such a manner that its longitudinal axis X—X is coincident with the direction of movement of the motor, respectively with the direction of running of the vehicle equipped with the motor. The ventilation wind thus strikes in the direction of the arrows M shown in Fig. 13, between the pipe 12 and the jacket 13 throughout and produces, at its exit, behind the tuyere 13b and, in consequence of the ejector-shaped formation thereof, a depression of air, which operates an acceleration in the direction of the arrows N within the tube 12 for the flowing exhaust gases, which means that actually a suction of the same is performed within the pipe. A part of the ventilating wind passing through the jacket 13 is caught by the bent lugs 24 and deviated inside the pipe 12, where this cool ventilation wind becomes mixed with the exhaust gases which are still at a relatively high temperature, so that said gases become cooled. This relatively intense cooling now produces an appreciable contraction of volume in the exhaust gases. As, however, now only the volume but not the weight of the mass of gases is reduced during a determined time within the exhaust silencer, and as therefore also the current energy of this mass of gases remains unmoved, the crimped mass of gases within the exhaust silencer is submitted to a further expelling speed, under the said final accelerating suction between the column of exhaust gas existing between the silencer and the motor. All this has for result not only a considerable reducing of the noise of the exhaust, but moreover secures a perfectly good filling of the motor cylinder and thus a perfectly improved working with respect to output as well in view of the degree of industrial efficiency as for the stroke volume.

I claim:

1. Means for destroying the energy of mass oscillations of a body of solid material, comprising a dampening mass of a material of low elasticity slidably mounted on the body at the place of greatest amplitude of oscillation for performing oscillatory motions in the same direction as but of different phase from the mass oscillations of the body, and for collision with the said body on each change in direction of the mass oscillations of the said body.

2. In means for destroying the energy of mass oscillations of a body of solid material, a dampening mass consisting of a material having a high mass density and slidable on the body in the direction of the mass oscillations and forced by the said mass oscillations to oscillate in a manner similar to but in different phase from the said body and thereby to collide with the said body at each reversal of the said mass oscillation and thereby destroy energy acting to produce mass oscillation.

3. Means for destroying the energy of mass oscillations of a body of solid material, comprising a dampening mass mounted at the place of greatest oscillation amplitude on the said body slidably in the directions of the said mass oscillations for independent small displacements of the dampening means relative to the said body in the directions of the said mass oscillations, the dampening mass being forced by the said body to oscillate therewith and the directional change of oscillation of the dampening mass being produced by the said body after each directional change of oscillation of the said body has occurred, and the dampening mass and the said body impinging against each other at every directional change of oscillation and thereby producing a collision which robs the dampening mass and the said body of mass oscillation energy.

4. Means for destroying the energy of mass oscillations of a body of solid material, comprising a dampening mass slidably mounted on the said body at the place of greatest amplitude of oscillation thereon for sliding to and fro on the said body in the directions of oscillation of the said body to an extent which is not less than about twice the value of the amplitude of oscillation of the said body and for impingement with the said body in a collision like manner on each directional change of oscillation of the body.

CONRAD FRIEDRICH BYLAND.